(12) United States Patent
Tyler et al.

(10) Patent No.: US 8,198,859 B2
(45) Date of Patent: Jun. 12, 2012

(54) INTRA-VEHICLE CHARGING SYSTEM FOR USE IN RECHARGING VEHICLES EQUIPPED WITH ELECTRICALLY POWERED PROPULSION SYSTEMS

(75) Inventors: Richard M. Tyler, Evergreen, CO (US); Daniel B. McKenna, Vail, CO (US); James M. Graziano, Hotchkiss, CO (US)

(73) Assignee: Lava Four, LLC, Vail, CO (US)

( * ) Notice: Subject to any disclaimer, the term of this patent is extended or adjusted under 35 U.S.C. 154(b) by 432 days.

(21) Appl. No.: 12/436,450

(22) Filed: May 6, 2009

(65) Prior Publication Data

US 2010/0145535 A1 Jun. 10, 2010

Related U.S. Application Data

(63) Continuation-in-part of application No. 12/329,349, filed on Dec. 5, 2008, now abandoned, and a continuation-in-part of application No. 12/329,368, filed on Dec. 5, 2008, now abandoned, and a continuation-in-part of application No. 12/329,389, filed on Dec. 5, 2008, now abandoned.

(51) Int. Cl.
*H02J 7/00* (2006.01)
*H02J 7/14* (2006.01)
*B60K 6/20* (2007.10)

(52) U.S. Cl. ........ 320/109; 320/104; 320/132; 320/137; 320/140; 320/152; 903/903; 903/907; 180/65.21

(58) Field of Classification Search ............... 320/104, 320/109
See application file for complete search history.

(56) References Cited

U.S. PATENT DOCUMENTS

| | | | |
|---|---|---|---|
| 4,532,418 A | 7/1985 | Meese et al. | |
| 5,297,664 A | 3/1994 | Tseng et al. | |
| 5,461,299 A | 10/1995 | Bruni | |
| 5,523,666 A * | 6/1996 | Hoelzl et al. | 320/109 |
| 5,648,906 A | 7/1997 | Amirpanahi | |
| 2007/0126395 A1 | 6/2007 | Suchar | |
| 2009/0174365 A1 * | 7/2009 | Lowenthal et al. | 320/109 |

FOREIGN PATENT DOCUMENTS

EP 0021370 B1 1/1981

* cited by examiner

*Primary Examiner* — Edward Tso
*Assistant Examiner* — Ahmed Omar
(74) *Attorney, Agent, or Firm* — Patton Boggs LLP

(57) ABSTRACT

The E-Grid Sub-Network Load Manager operates to regulate the demands presented by vehicles to the associated Sub-Network thereby to spread the load presented to the service disconnect over time to enable controllable charging of a large number of vehicles. Load management can be implemented by a number of methodologies, including: queuing requests and serving each request in sequence until satisfaction; queuing requests and cycling through the requests, partially serving each one, then proceeding to the next until the cyclic partial charging service has satisfied all of the requests; ordering requests pursuant to a percentage of recharge required measurement; ordering requests on an estimated connection time metric; ordering requests on a predetermined level of service basis; and the like. It is evident that a number of these methods can be concurrently employed thereby to serve all of the vehicles in the most efficient manner that can be determined.

16 Claims, 11 Drawing Sheets

INTRA-VEHICLE CHARGING SYSTEM FOR USE IN RECHARGING VEHICLES EQUIPPED WITH ELECTRICALLY POWERED PROPULSION SYSTEMS

CROSS-REFERENCE TO RELATED APPLICATIONS

This application is a Continuation-In-Part of U.S. application Ser. No. 12/329,349 titled "Self-Identifying Power Source For Use In Recharging Vehicles Equipped With Electrically Powered Propulsion Systems" filed 5 Dec. 2008, now abandoned and U.S. application Ser. No. 12/329,368 titled "System For On-Board Metering Of Recharging Energy Consumption In Vehicles Equipped With Electrically Powered Propulsion Systems" filed 5 Dec. 2008, now abandoned and U.S. application Ser. No. 12/329,389 titled "Network For Authentication, Authorization, And Accounting Of Recharging Processes For Vehicles Equipped With Electrically Powered Propulsion Systems" filed 5 Dec. 2008 now abandoned. In addition, this Application is related to a US Application titled "Sub-Network Load Management For Use In Recharging Vehicles Equipped With Electrically Powered Propulsion Systems", a US Application titled "Dynamic Load Management For Use In Recharging Vehicles Equipped With Electrically Powered Propulsion Systems", and a US Application titled "Centralized Load Management For Use In Recharging Vehicles Equipped With Electrically Powered Propulsion Systems", all filed on the same date as the present application and incorporating the disclosures of each herein.

FIELD OF THE INVENTION

This invention relates to a system for delivering power via a plurality of sub-networks for use in recharging vehicles equipped with electrically powered propulsion systems, where the Electric Grid interconnect used in each sub-network provides a unique power source identification to the vehicle for energy consumption billing purposes.

BACKGROUND OF THE INVENTION

It is a problem in the field of recharging systems for vehicles equipped with electrically powered propulsion systems to bill the vehicle operator for the energy consumption where the Electric Grid is used as the source of power to charge the vehicular battery banks. Presently, each outlet that is served by a local utility company is connected to the Electric Grid by an electric meter which measures the energy consumption of the loads that are connected to the outlet. The utility company bills the owner of the premises at which the outlet is installed for the total energy consumption for a predetermined time interval, typically monthly. Recharging a vehicle which is equipped with an electrically powered propulsion system results in the premises owner errantly being billed for the recharging and the vehicle owner not being billed at all. An exception to this scenario is where the premises owner is paid a flat fee by the vehicle owner for the use of the outlet to recharge the vehicular battery banks.

Electric transportation modes typically take the form of either a pure battery solution, where the battery powers an electric propulsion system, or a hybrid solution, where a fossil fuel powered engine supplements the vehicle's battery bank to either charge the electric propulsion system or directly drive the vehicle. Presently, there is no electricity re-fueling paradigm, where a vehicle can plug in to the "Electric Grid" while parked at a given destination and then recharge with sufficient energy stored in the vehicular battery banks to make the trip home or to the next destination. More to the point, the present "grid paradigm" is always "grid-centric"; that is, the measurement and billing for the sourced electricity is always done on the grid's supply side by the utility itself. One example of a system that represents this philosophy is the municipal parking meter apparatus, where an electric meter and credit card reader is installed at every parking meter along a city's streets to directly bill vehicle owners for recharging their vehicular battery banks. Not only is this system very expensive to implement, but it remains highly centralized and is certainly not ubiquitous. This example solution and other analogous grid-centric solutions are not possible without an incredible capital expenditure for new infrastructure and an extensive build time to provide widespread recharging capability.

Thus, the problems with centralized vehicular charging are:

infrastructure cost,
lack of ubiquity in the infrastructure's extent,
extensive time to deploy a nationwide system,
can't manage/control access to electricity without a per outlet meter,
no ubiquity of billing for downloaded electricity,
no method to assure a given utility is properly paid,
no method to provide revenue sharing business models,
no methods to manage and prevent fraud,
incapable of instantaneous load management during peak loads,
incapable of load management on a block by block, sector by sector load, or city-wide basis, and
incapable of billing the energy "downloaded" to a given vehicle, where a given vehicle is random in its extent, and where the vehicle is plugged into the grid is also random in its extent.

What is needed is a solution that can be deployed today, that doesn't require a whole new infrastructure to be constructed, is ubiquitous in its extent, and that uses modern communications solutions to manage and oversee the next generation electric vehicle charging grid.

The above-noted patent applications (U.S. application Ser. No. 12/329,349 titled "Self-Identifying Power Source For Use In Recharging Vehicles Equipped With Electrically Powered Propulsion Systems" filed 5 Dec. 2008, and U.S. application Ser. No. 12/329,368 titled "System For On-Board Metering Of Recharging Energy Consumption In Vehicles Equipped With Electrically Powered Propulsion Systems" filed 5 Dec. 2008, and U.S. application Ser. No. 12/329,389 titled "Network For Authentication, Authorization, And Accounting Of Recharging Processes For Vehicles Equipped With Electrically Powered Propulsion Systems" filed 5 Dec. 2008) collectively describe an E-Grid concept for use in providing power to vehicles which include a propulsion system powered, at least in part, by electric power, at least some of which is stored onboard the vehicle in an electric power storage apparatus.

A key element of the conceptual "Charging-Grid" solution presented therein is not unlike the problem faced by early cellular telephone operators and subscribers. When a cellular subscriber "roamed" out of their home "network", they couldn't make phone calls, or making phone calls was either extremely cumbersome or expensive or both. The present E-Grid Sub-Network Load Manager is a part of an "E-Grid" billing structure, which includes full AAA functionality—Authentication, Authorization, and Accounting. For the early historical cellular paradigm, the cellular architecture used a centralized billing organization that managed the "roaming"

cellular customer. In a like fashion, the E-Grid proposed herein has a centralized billing structure that manages the "roaming" vehicle as it "self-charges" at virtually any power source/electric outlet in a seamless yet ubiquitous manner anywhere a given utility is connected to the "E-Grid architecture".

A second component of the E-Grid is to place the "electric meter" in the vehicle itself to eliminate the need to modify the Electric Grid. The Self-Identifying Power Source provides the vehicle's electric meter with a unique identification of the power source to enable the vehicle to report both the vehicle's energy consumption and the point at which the energy consumption occurred to the utility company via the ubiquitous communications network.

An advantage of this architecture is that the vehicle is in communication with the utility company, which can implement highly dynamic load management, where any number of vehicles can be "disconnected" and "reconnected" to the Electric Grid to easily manage peak load problems for geographic areas as small as a city block or as large as an entire city or even a regional area.

The innovative "E-Grid" architecture enables a vehicle to plug in anywhere, "self-charge", and be billed in a seamless fashion, regardless of the utility, regardless of the vehicle, regardless of the location, regardless of the time. The utility for that given downloaded charge receives credit for the electricity "downloaded" across their network, whether that customer is a "home" customer or a "roaming" customer. The "owner" of the electrical outlet receives credit for the power consumed from their "electrical outlet". In addition, if a given customer has not paid their E-Grid bill, the system can directly manage access to the grid to include rejecting the ability to charge or only allowing a certain charge level to enable someone to get home. The E-Grid architecture can have account managed billing, pre-paid, and post-paid billing paradigms. The billing is across any number of electric utility grids, and the E-Grid architecture is completely agnostic to how many utility suppliers there are or where they are located. So too, the E-grid architecture is agnostic to the charging location, where said charging location does not require a meter and does not require telecommunications capability.

The compelling societal benefit of the novel E-Grid architecture is that it is possible to deploy it today, without a major change in current infrastructure or requiring adding new infrastructure. Virtually every electrical outlet, no matter where located, can be used to charge a vehicle, with the bill for that charge going directly to the given consumer, with the owner of the electrical outlet getting a corresponding credit, with the payment for electricity going directly to the utility that provided the energy—all in a seamless fashion.

One problem faced by the E-Grid is that typically a number of vehicles arrive at a destination in close temporal proximity, connect to the power sources served by a service disconnect, and concurrently request service. Once their batteries are charged, there is no load placed on the service disconnect until these vehicles depart and other vehicles arrive to be recharged. Given this high demand scenario, a single service disconnect can serve only a limited number of vehicles at a time if they concurrently demand the delivery of power. This is a peak load issue, where the existing service disconnect is unable to manage a plurality of concurrently received requests for service and, therefore, is limited in the number of vehicles that can be served.

BRIEF SUMMARY OF THE INVENTION

The above-described problems are solved and a technical advance achieved by the present Intra-Vehicle Charging System For Use In Recharging Vehicles Equipped With Electrically Powered Propulsion Systems (termed "Intra-Vehicle Charging System" herein) which manages a plurality of power sources to which the vehicles are connected to manage delivery of the power consumed by the recharging of the vehicular battery banks, including transferring power among the vehicles connected to the power sources.

The E-Grid typically is implemented via the use of a plurality of utility interfaces, each of which includes an electric meter which is installed at a utility customer's facilities and an associated service disconnect. The term "service disconnect" as used herein can be a main service disconnect which serves a plurality of Self-Identifying Power Sources as described herein, or a main service disconnect which serves a plurality of circuit breakers, each of which serves a plurality of the Self-Identifying Power Sources. The present E-Grid Sub-Network Load Manager is applicable to both architectures and is used to regulate the demand for power as concurrently presented by a plurality of vehicles which are connected to a Sub-Network of the E-Grid, where the sub-network can be either the plurality of Self-Identifying Power Sources served by the single service disconnect noted above or each sub-set comprising the plurality of Self-Identifying Power Sources served by each of the circuit breakers connected to a single service disconnect. In the multiple circuit breaker architecture, the E-Grid Sub-Network Load Manager can operate on a hierarchical basis, regulating not only the loads presented to each circuit breaker, but also to the service disconnect, since it is standard practice in electrical installations to have the sum of the current handling capacities of the circuit breakers exceed the current handling capacity of the associated service disconnect.

The E-Grid Sub-Network Load Manager operates to regulate the demands presented by the vehicles to the associated Sub-Network thereby to spread the load presented to the service disconnect over time to enable the controllable charging of a large number of vehicles. The Intra-Vehicle Charging System provides another dimension to the load management process, where the vehicular battery banks act as a power source to enable the delivery of power to vehicles whose battery banks are depleted from vehicles whose vehicular battery banks are substantially charged. Thus, the vehicular battery banks of some of the vehicles can be used to replace or supplement the traditional power sources to enable rapid recharging of the vehicles which are served by the E-Grid Sub-Network Load Manager. When the depleted vehicular battery banks reach a predetermined capacity and/or the load on the E-Grid is reduced, the Intra-Vehicle Charging System can be deactivated or scaled back to enable the E-Grid Sub-Network Load Manager to resume control of the charging process to recharge all of the vehicles served by the E-Grid Sub-Network Load Manager. Thus, the Intra-Vehicle Charging System is an interim load mitigation process to ensure that no vehicle fails to receive some minimum amount of recharging while connected to the E-Grid.

The implementation of the E-Grid Sub-Network Load Manager can include intelligent Self-Identifying Power Sources which can be controlled to deliver power on a basis determined by the E-Grid Sub-Network Load Manager and/or the use of intelligent Self-Metering Vehicles which can be controlled to request power on a basis determined by the E-Grid Sub-Network Load Manager or combinations of both. In addition, the availability of information from the Self-Metering Vehicles relating to power required to recharge, recharge current handling capacity, estimated time of connection, and class of service for which the vehicle owner has contracted all enhance the operation of the E-Grid Sub-Network Load Manager, which operates in conjunction with the Intra-Vehicle Charging System.

DETAILED DESCRIPTION OF THE INVENTION

Figure 1:
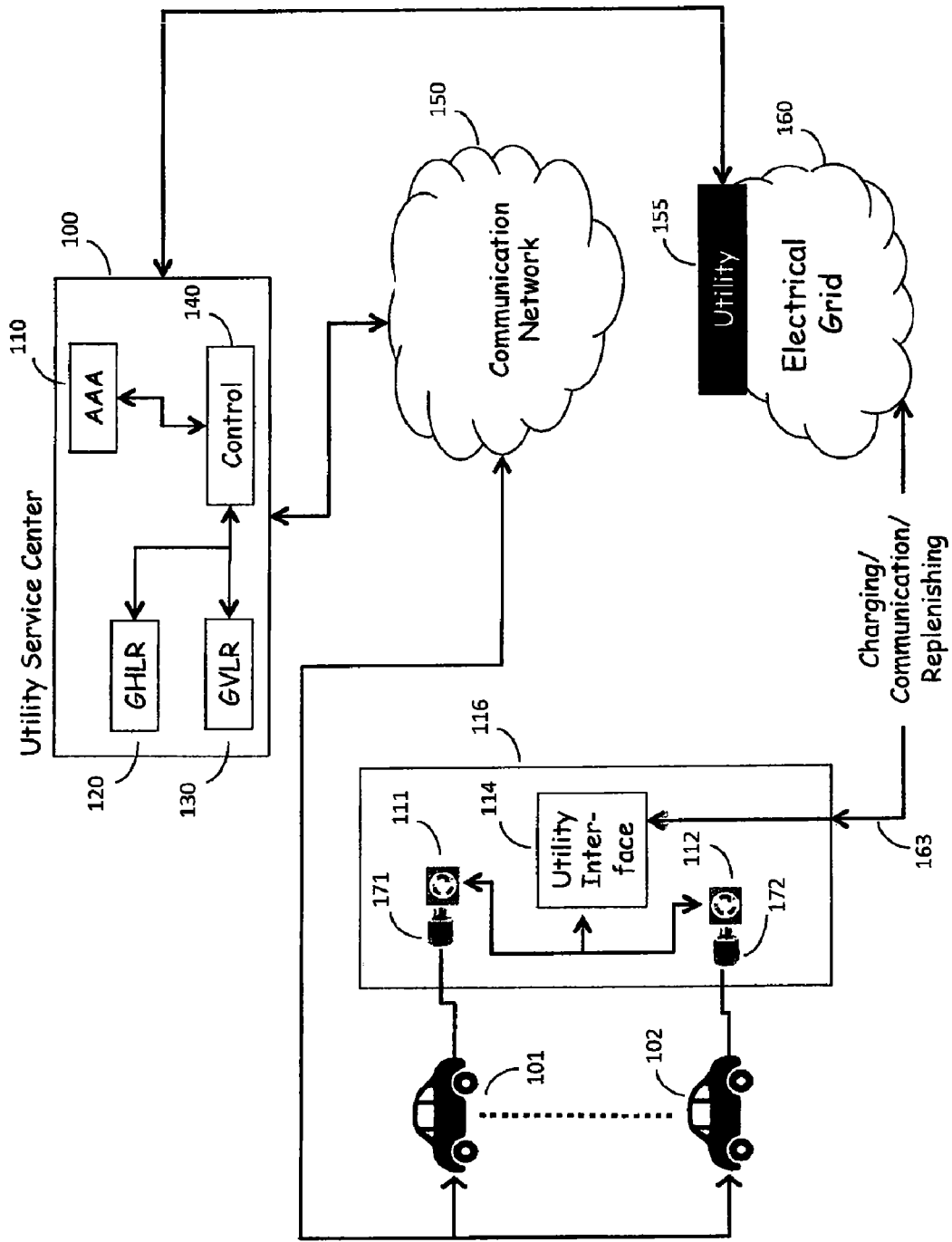
FIG. 1 illustrates, in block diagram form, the E-Grid network architecture, including interconnected communication networks with a unified authentication, authorization, and accounting structure.
Figure 2:
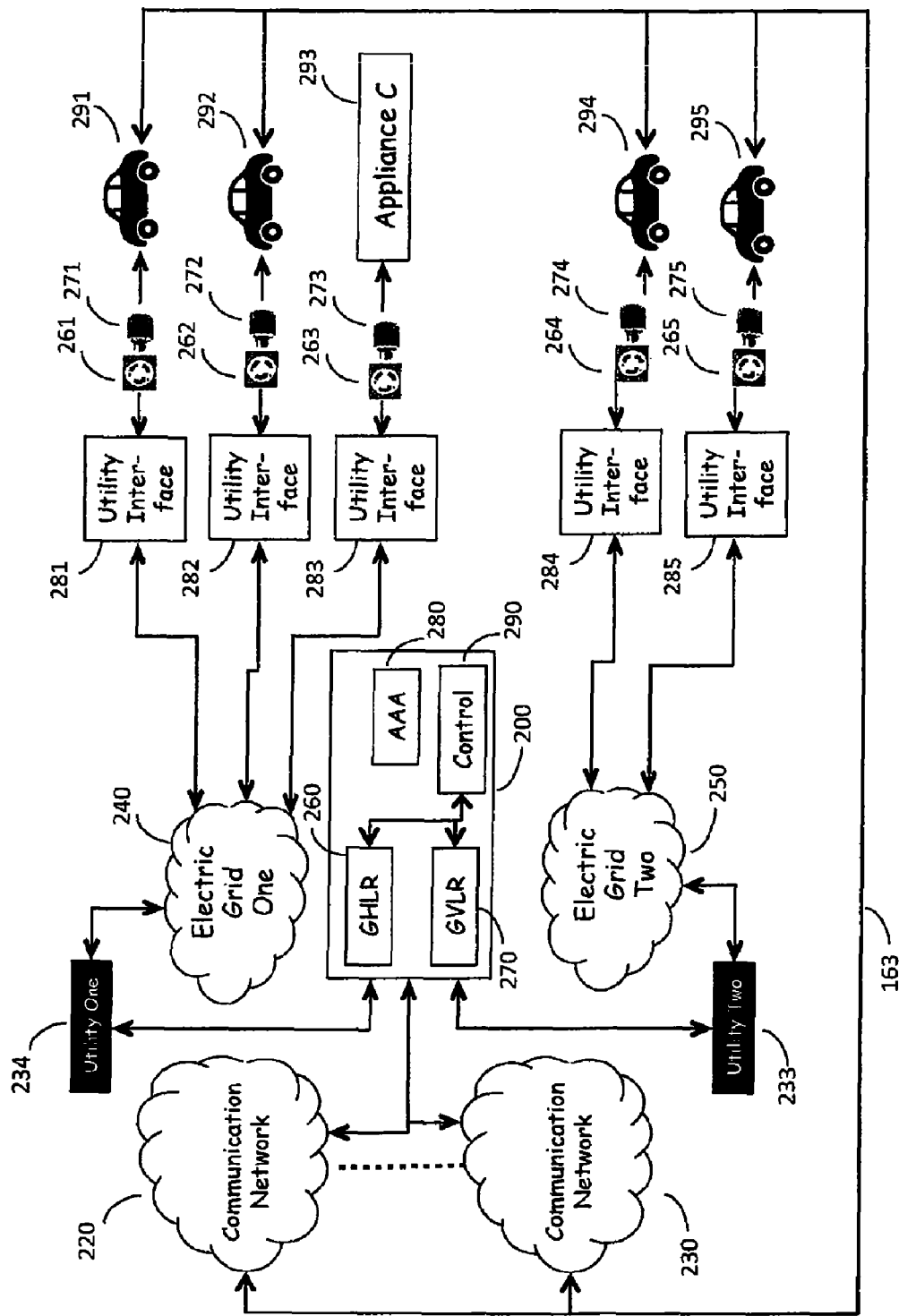
FIG. 2 illustrates, in block diagram form, a more detailed embodiment of the E-Grid network architecture shown in FIG. 1 which discloses multiple utility companies.

FIG. 1 illustrates, in block diagram form, the E-Grid network architecture, including interconnected communications networks with a unified authentication, authorization, and accounting structure; while FIG. 2 illustrates, in block diagram form, a more detailed embodiment of the E-Grid network architecture shown in FIG. 1. In the following description, the term "Vehicle" is used, and this term represents any mechanism which includes a propulsion system powered, at least in part, by electric power, at least some of which is stored onboard the vehicle in an electric power storage apparatus, as well as any electric power consuming loads incorporated into, transported by, or associated with any type of vehicle, whether or not these types of vehicles are electrically powered.

Traditional Electric Grid

Electric Grid 160 shown in FIG. 1 represents the source of electric power, as provided by multiple utility companies which serve a wide geographic area. For the purpose of illustration, the present description focuses on a single utility company 155 which serves a particular geographic area (service area) and provides electric power to a multitude of customers, via a utility interface 114 which typically comprises an electric meter which is installed at the customer's facilities 116 and an associated service disconnect. Nothing herein limits the physical elements contained within utility interface 114 to include that an electric meter may not be a part of utility interface 114 in certain applications.

The electric meter in utility interface 114 serves to measure the energy consumption by the various outlet connected loads, such as Vehicles 101, 102 and fixed loads (not shown) which are connected to the customer's electric meter via a customer's service disconnect (circuit breaker panel), which is part of the utility interface 114 for the purpose of this description. These elements represent the existing electric power delivery infrastructure. The arrow shown at the bottom of FIG. 1 highlights the fact that the connection to Electric Grid 160 is bidirectional in that electric power traditionally flows from the Electric Grid 160 to the utility interface 114 and thence to the customer's loads—Vehicles 101, 102—but also can flow in the reverse direction, from the vehicular battery banks of Vehicles 101, 102, through the utility interface 114 to the Electric Grid 160; and these conductors can also carry Power Line Carrier (PLC) communications, such as data which identifies electrical outlet 111, via plug 171 to Vehicle 101. The PLC communication network could also be used as an alternate communication pathway to the Utility Service Center 100 for Authentication, Authorization, and Accounting functionality.

Utility Service Center

Communication Network 150 is the preferred communication medium which enables the Vehicles 101, 102 to communicate with Utility Service Center 100 to implement the Vehicle registration and billing processes of Control Processor 140 via Grid Home Location Register (GHLR) 120 and Grid Visitor Location Register (GVLR) 130. The Communication Network 150 comprises any technology: cellular, WiFi, wired Public Switched Telephone Network (PSTN), Internet, etc. The Grid Home Location Register 120 and Grid Visitor Location Register 130 are further connected to the Authentication, Authorization, and Accounting System 110 (AAA System 110). The communication mode for the Vehicles 101, 102 can be wireless, wired (such as via Communication Network 150), or via the Electric Grid 160 using Power Line Carrier as previously mentioned. For the purpose of illustration, a wireless link to the Communication Network 150 is used in this embodiment, although the other modes can be used.

The Vehicles 101, 102 first communicate with Communication Network 150 in well-known fashion to link to Utility Service Center 100 where the Control Processor 140 accesses the Location Registers 120 and 130. These devices contain the user profile for the account holder, including the identification of the home utility company, billing account, and maximum authorized credit, where the user is authorized to charge, identification of any value added services that the user subscribes to, and the like. When registering with the Utility Service Center 100, the Vehicles 101, 102 first seek to register with the Grid Home Location Register 120 if in their home territory (i.e., within the territory served by their residence's electric utility provider). If Vehicle 101 is traveling outside of its home territory, it would first register with the serving utility's Grid Visitor Location Register 130 which would then communicate with the user's Grid Home Location Register 120 to confirm that the user is a "real" customer, and all of the data stored in the Grid Home Location Register 120 about a particular customer is copied to the Grid Visitor Location Register 130 while the Vehicle 101 is in the "roaming" territory. Communications via network 150 (typically via wireless means) would let the Vehicles 101, 102 know whether they are in the home territory or whether they are roaming (not unlike how cellular phone networks operate today). After successful registration, the AAA System 110 begins to manage the charging transaction.

At AAA System 110, a number of essential functions occur. All Vehicles seeking to receive electrical power from Electric Grid 160 to charge the vehicular battery banks (also termed "electric energy storage apparatus") are first authenticated, then authorized, and billed for the energy consumed via the charging process. The term "authentication" means that a device is valid and permitted to access the Electric Grid 160 (the authorization phase of AAA). AAA System 110 also manages the accounting process, ensuring that all bills go to the correct vehicle owner, the electric utility gets paid for the electricity that it supplied, and the owner of utility interface 114 is credited with the electricity that flowed through utility interface 114 to recharge the vehicular battery banks. There could also be revenue share models where a facility owner could get a portion of the overall revenue for providing physical access (i.e., an electrical plug-in location). AAA System 110 is seen as a more central device, to be shared among a number of electric utilities, although there is nothing from preventing each utility having its own AAA System.

Multi-Utility Embodiment

FIG. 1 is in reality a multidimensional network in which N electric utilities are served by M Electric Grids with corresponding communication networks, as shown in FIG. 2.

Electric Grids 240, 250 shown in FIG. 2 represent the source of electric power, as provided by multiple utility companies which serve a wide geographic area and provide electric power to a multitude of customers via utility interfaces 281-285. The utility interfaces 281-285 serve to measure the energy consumption by the various outlet connected loads, such as Vehicles 291-295. These elements represent the existing, present day electric power delivery infrastructure as described above. Electric power traditionally flows from the Electric Grid 240, 250 to the utility interfaces 281-285 and thence to the customer's loads—Vehicles 291-295 via plug 271-275-outlet 261-265 combinations, but power also can flow in the reverse direction, from the vehicular battery banks of Vehicles 291-295 through the utility interfaces 281-285 to the Electric Grids 240, 250.

Communication Networks 220, 230 are the communication mediums which enable the Vehicles 291-295 to communicate with Utility Service Center 200 which, as noted above, implements the vehicle registration process via Grid Home Location Register (GHLR) 260 and Grid Visitor Location Register (GVLR) 270. The Grid Home Location Register 260 and Grid Visitor Location Register 270 are further connected to the Authentication, Authorization, and Accounting System 280 (AAA System 280). The communication mode for the Vehicles 291-295 can be wireless, wired, or via the Electric Grid, as previously discussed. For the purpose of illustration, a wireless link to the Communication Networks 220, 230 is used in this embodiment, although the other communication modes can be used.

Self-Identifying Power Source

Figure 6:
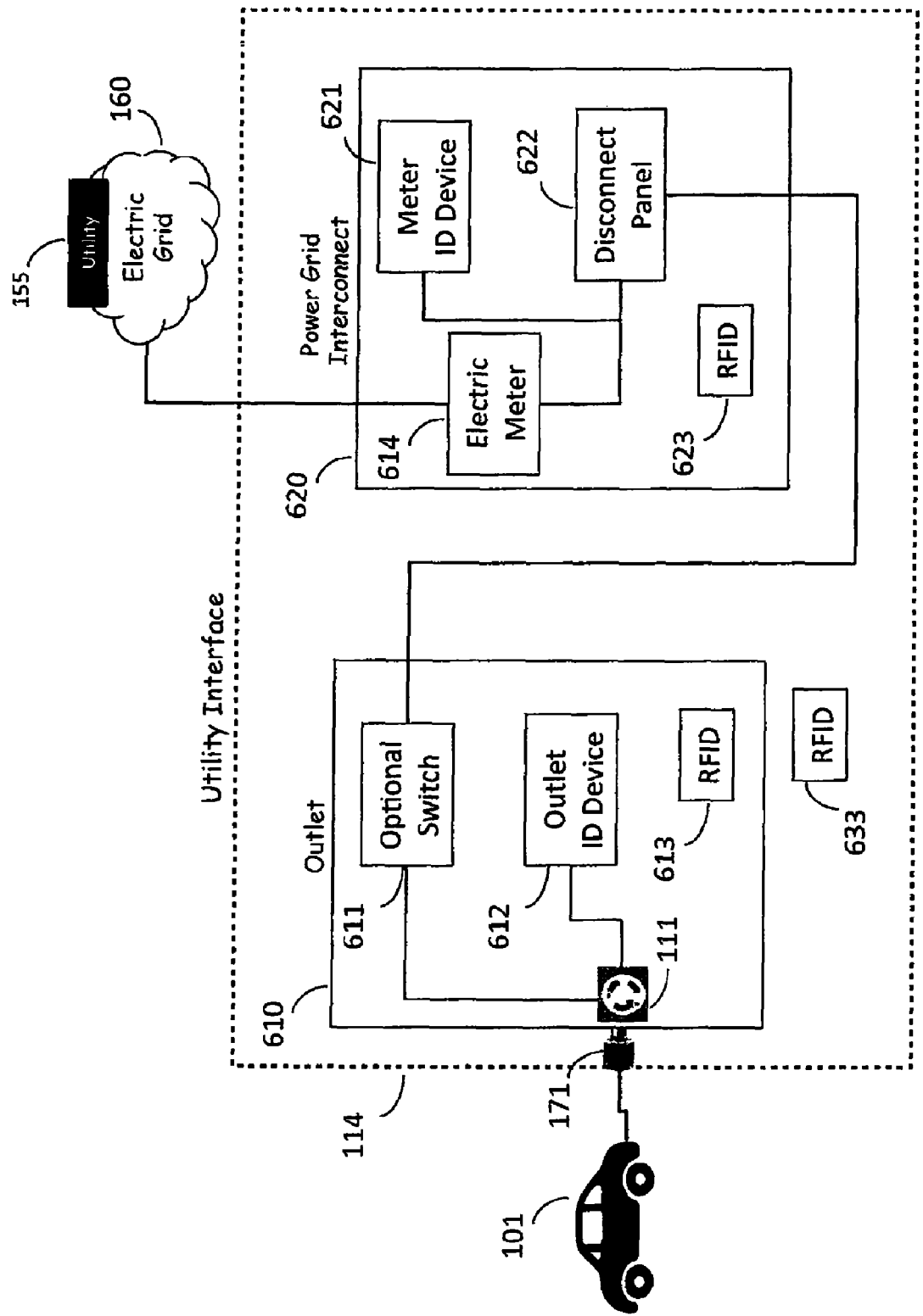
FIG. 6 illustrates an embodiment of the Self-Identifying Power Source for use in the E-Grid system.

FIG. 6 illustrates an embodiment of the present Self-Identifying Power Source 116 for use in the E-Grid system. The Self-Identifying Power Source 116 can be implemented in a variety of ways, and FIG. 6 illustrates the components that can be used to produce and transmit a unique identification of the power source to a vehicle for energy consumption credit and billing purposes. As noted above, it is a problem in the field of recharging systems for vehicles equipped with electrically powered propulsion systems to bill the vehicle operator or the financially responsible party for the energy consumption where the Electric Grid is used as the source of power to charge the vehicular battery banks. Presently, each outlet (or jack or inductive power source) that is served by a local utility company is connected to the Electric Grid by a utility meter which measures the energy consumption of the loads that are connected to the outlet. The utility company bills the owner of the premises at which the outlet is installed for the total energy consumption for a predetermined time interval, typically monthly.

The solution to this problem is to have the vehicle self-meter its energy consumption in recharging the vehicular battery banks and report the energy consumption to the utility company that serves the power source to which the vehicle is connected. The utility company then can bill the vehicle owner and simultaneously credit the power source for this consumption. In implementing this paradigm, the power source identification can be implemented at various layers of the power distribution network. The outlet 111 to which the Vehicle 101 connects can identify itself, the utility interface 114 (such as a utility meter) can identify itself, or the premises at which the outlet 111 and the utility interface 114 (in this example a meter 614) are installed and physically located can be identified. All of these scenarios are effective to enable the utility company to credit the owner of the power source with the power consumed by Vehicle 101.

Power Source Identification—Outlet Level

A first implementation of the power source identification is at the outlet level, where the self-identifying element comprises an electrical outlet 111 having a housing into which are molded a plurality of conductors that function to conduct the electricity from the electric meter 614 (and associated circuit protection devices) to a plug 171 from the Vehicle 101 which is inserted into the outlet 111 of the Self-Identifying Power Source 116. There are numerous outlet conductor configurations which are specified by regulatory agencies, such as the National Electric Manufacturers Association (NEMA), for various voltages and current capacities; and a typical implementation could be a 2-pole 3-wire grounding outlet to reduce the possibility that the plug which is connected to the vehicle would be inadvertently disconnected from the Self-Identifying Power Source 116.

The Self-Identifying Outlet 610 of the Self-Identifying Power Source 116 includes an outlet identification device 612 which transmits outlet identification data to the Vehicle 101. This outlet identification data represents a unique code which identifies this particular Self-Identifying Outlet 610 of the Self-Identifying Power Source 116 in order for the owner of the associated electric meter 614 to receive credit for the energy consumption associated with the present vehicle battery recharging process. This outlet identification data can be transmitted over the power conductors or can be wirelessly transmitted to the vehicle by the outlet identification device 612, or may constitute an RFID solution where the vehicle reads the RFID code embedded in RFID device 613 located in the Self-Identifying Outlet 610 of the Self-Identifying Power Source 116. In addition to the unique identification of the Self-Identifying Outlet 610 of the Self-Identifying Power Source 116, the data can indicate the mode of data transmission appropriate for this locale. Thus, the vehicle may be instructed via this locale data to wirelessly transmit the accumulated energy consumption data to a local premises server for accumulation and forwarding to the utility company, or wirelessly via a public Communication Network 150 directly to the utility company, or via the power conductors 163 to a communications module associated with the electric meter 614, or to the utility company 155 via the Electric Grid 160.

In operation, every time a mating plug is inserted into the outlet 111 of the Self-Identifying Power Source 116 or the Vehicle 101 "pings" the Self-Identifying Outlet 610, the outlet identification device 612 outputs the unique outlet identification data or RFID Device 613 provides a passive identification read capability to enable the Vehicle 101 to uniquely identify the Self-Identifying Outlet 610 of the Self-Identifying Power Source 116.

In addition, a power switch 611 can optionally be provided to enable the utility company 155 to disable the provision of power to Vehicle 101 pursuant to the authorization process described below. Switch 611 can be activated via a power line communications session with the utility company 155 via the Electric Grid 160. Alternatively, this switch could be "virtual" and located in the vehicle itself where the vehicle does not permit charging to occur even though the outlet 111 may be "hot" or have power to it.

Power Source Identification—Electric Grid Interconnect Level

A second implementation of the power source identification is at the Electric Grid interconnect 620 level, where the self-identifying element comprises one or more identification devices associated with the electric meter 614. Since each premises is equipped with an electric meter 614 required by the utility company and one or more disconnect devices 622 to serve one or more outlets 610, the identification of a utility meter as the Electric Grid interconnect is sufficient data to enable the utility company to credit the premises owner with the power consumed by Vehicle 101. Since the Vehicle 101 self-meters, for billing purposes it is irrelevant which outlet 111 serves to provide power to the Vehicle 101. The energy consumption session, as described in more detail below, is not dependent on the exact physical connection of Vehicle 101 to an outlet 111, but can be managed at the power grid interconnection 620 level.

Thus, meter identification device 621 transmits meter identification data to the Vehicle 101. This meter identification data represents a unique code which identifies this particular electric meter 614 of the Self-Identifying Power Source 116 in order for the owner of the associated electric meter 614 to receive credit for the energy consumption associated with the present vehicle battery recharging process. This meter identification data can be transmitted over the power conductors or can be wirelessly transmitted to the vehicle by the meter identification device 621, or may constitute an RFID solution where the vehicle reads the RFID code embedded in RFID device 623 located in the power grid interconnect 620 of the Self-Identifying Power Source 116. In addition to the unique identification of the power grid interconnect 620 of the Self-Identifying Power Source 116, the data can indicate the mode of data transmission appropriate for this locale. Thus, the vehicle may be instructed via this locale data to wirelessly transmit the accumulated energy consumption data to a local premises server for accumulation and forwarding to the utility company, or wirelessly via a public Communication Network 150 directly to the utility company, or via the power conductors 163 to a communications module associated with the electric meter 614, or to the utility company 155 via the Electric Grid 160.

Power Source Identification—Premises Level

The recharging process to include billing and crediting is not necessarily dependent on meter 614 shown in FIG. 6. For example, a third embodiment involves an intelligent identification communication architecture communicated via Power Line Carrier (PLC) communication from Utility Company 155 to Electric Grid 160 which ultimately arrives at each and every outlet in the universe of the Electric Grid 160. This intelligent Outlet ID is communicated directly to outlet 111 (not shown directly on FIG. 6) wherein each outlet has a unique ID as identified and managed by the Utility 155. This Power Line Carrier ID communication goes directly from Utility Company 155 to Electric Grid 160 via Utility Interface 114 to Vehicle 101 to PLC Communication Module 560 (shown in FIG. 5).

A fourth implementation of the power source identification is at the premises level, where the self-identifying element comprises one or more identification devices (such as RFID device 633) associated with the physical premises served by one or more power grid interconnects 620. Since a plurality of electric meters 614 can be used to serve a plurality of outlets 111 located at a physical premises, the granularity of identifying the owner of the premises is sufficient to implement the energy consumption credit process as described herein. Thus, Vehicle 101 can sense an RFID device 633 upon entry into the premises at which the outlet 111 is located and use the RFID data, as described above, as the utility company customer identification, since Vehicle 101 self-meters its energy consumption.

Vehicle Infrastructure

Figure 4:
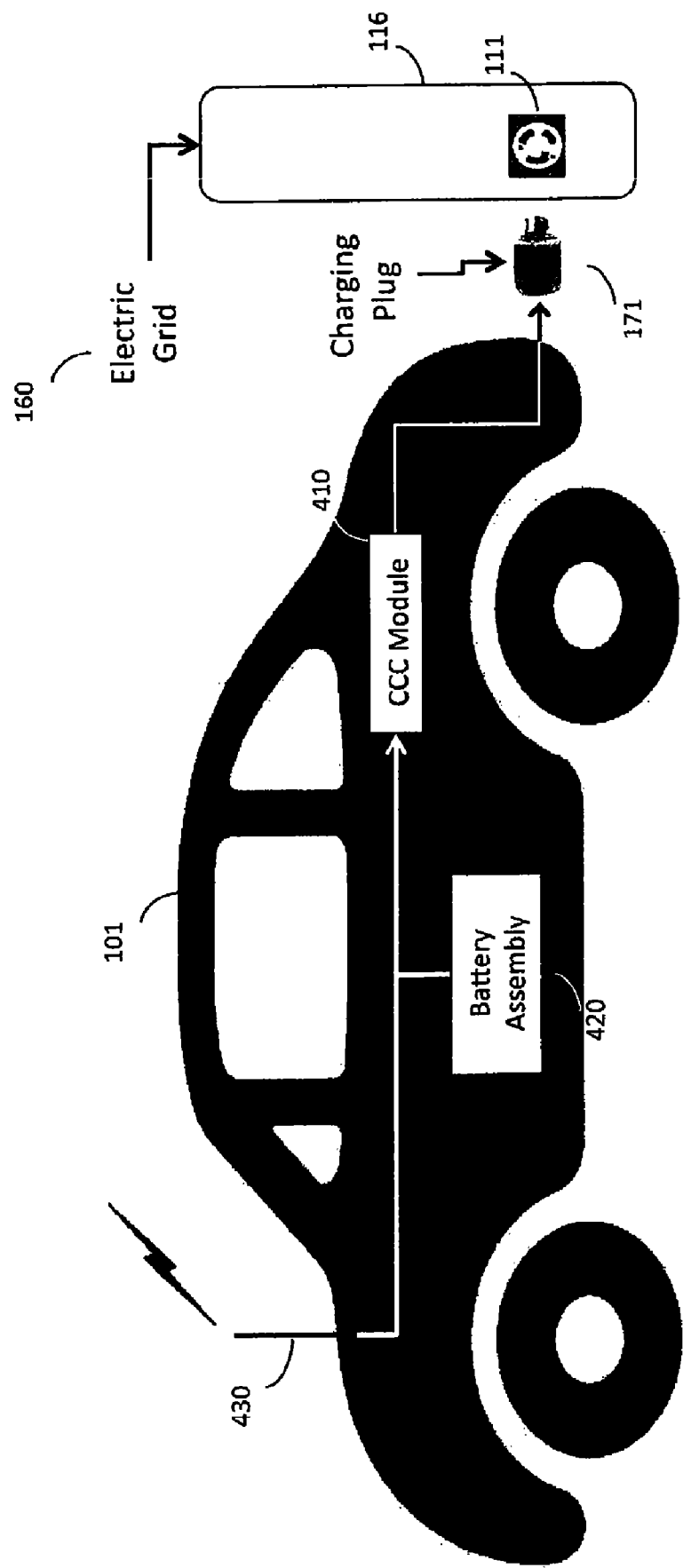
FIG. 4 illustrates, in block diagram form, the Charging, Control, and Communicator (CCC) module installed in a vehicle.
Figure 5:
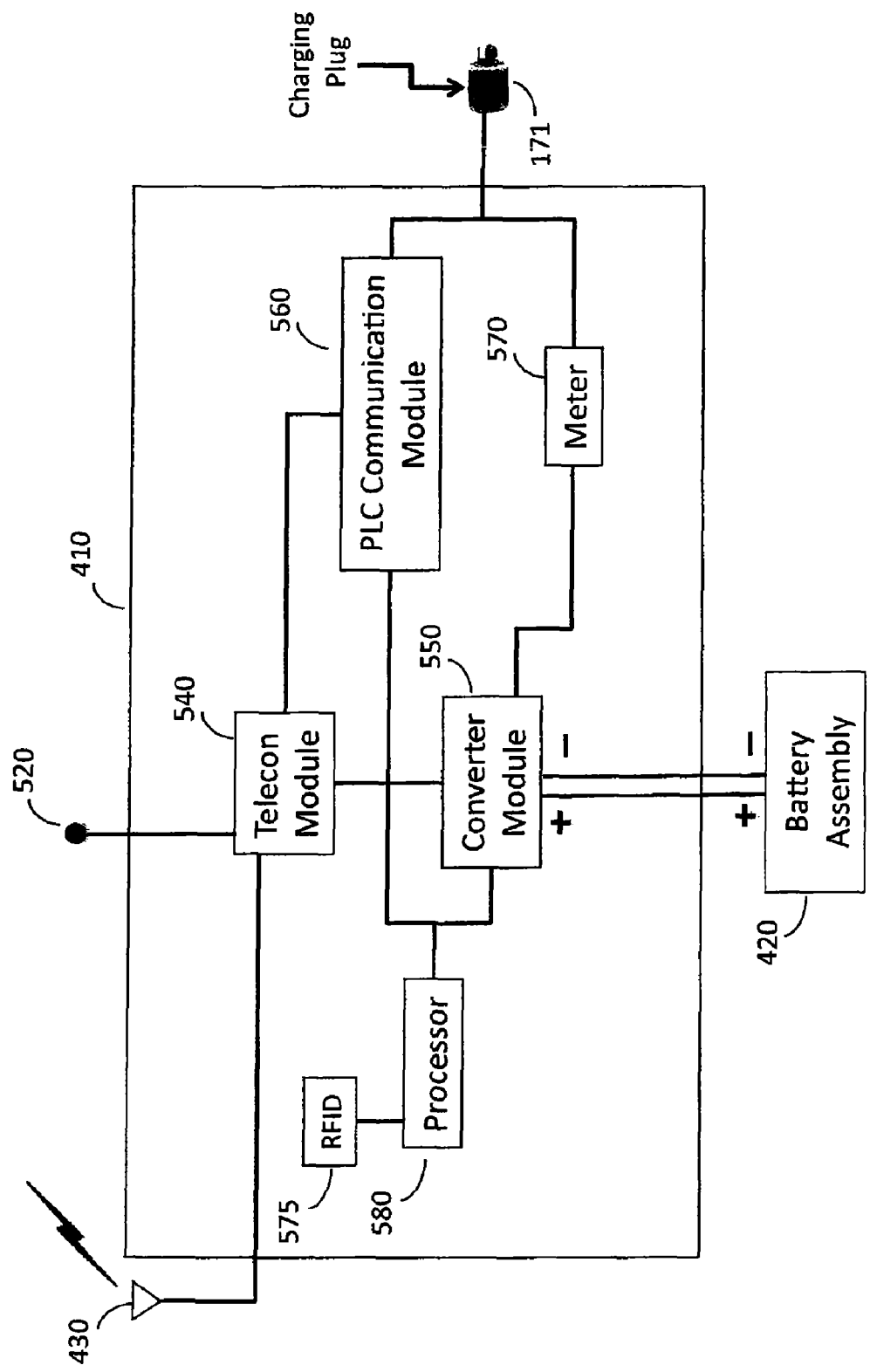
FIG. 5 illustrates, in block diagram form, a detailed block diagram of the CCC module.

FIG. 4 illustrates, in block diagram form, the Charging, Control, and Communicator (CCC) module 410 installed in a vehicle; and FIG. 5 illustrates, in block diagram form, a detailed block diagram of the CCC module 410. The Vehicle 101 is equipped with an electrically powered propulsion system and vehicular battery banks 420 (or any such device that can store electrical energy). Presently, each outlet that is served by a local utility company is connected to the Electric Grid 160 by a utility meter 614 housed in Utility Interface 114 which measures the energy consumption of the loads that are connected to the outlet. The utility company bills the owner of the premises at which the outlet is installed for the total energy consumption for a predetermined time interval, typically monthly. Recharging a vehicle which is equipped with an electrically powered propulsion system results in the premises owner being billed for the recharging and the vehicle owner not being billed.

The present paradigm is to place the "electric meter" in the vehicle itself to eliminate the need to modify the Electric Grid. As shown in FIG. 6, the present Self-Identifying Power Source 116 provides the vehicle's electric meter with a unique identification of the outlet 111 to enable the vehicle to report both the vehicle's energy consumption and the point at which the energy consumption occurred to the utility company via the ubiquitous communications network. The consumption can be reported for each instance of connection to the Electric Grid or the Vehicle can "accumulate" the measure of each energy consumption session, then periodically transmit energy consumption information along with the associated unique outlet identification data to the power company or a third party billing agency via the communication network. Alternatively, transmission of these signals to the power company via power lines is a possibility (Power Line Carrier). Another mode of billing is for the vehicle to be equipped with a usage credit accumulator which is debited as power is consumed to charge the vehicle's battery. The credit accumulator is replenished as needed at predetermined sites or via WiFi/Cellular or via Power Line Carrier.

The Charging, Control, and Communicator (CCC) module 410 is shown in additional detail in FIG. 5. The Vehicle 101 is equipped with either an inductive coupler (not shown) or a plug 171 to enable receipt of electric power from the Self-Identifying Power Source 116. Plug 171 is constructed to have the proper number and configuration of conductors to mate with Self-Identifying Power Source 116 in well-known fashion. These conductors are connected to meter 570 which measures the energy consumption of the circuitry contained in Charging, Control, and Communicator module 410. The principal load is converter module 550 which converts the electric voltage which appears on the conductors of plug 171 into current which is applied to battery assembly 420 thereby to charge battery assembly 420 in well-known fashion. The Processor 580 could call for a quick charge at a higher amperage, provided the Utility permits it; or the Processor 580 could call for a "trickle charge" over a number of hours. Processor 580 regulates the operation of charging module to controllably enable the charging of the battery assembly 420 (or such device that can store electrical energy) and to provide communications with the Utility Service Center 100. In particular, the processor 580 receives the unique identification data from Self-Identifying Power Source 116 once the plug 171 is engaged in Self-Identifying Power Source 116, or via wireless means such as using RFID without an actual physical connection as previously discussed, and then initiates a communication session with Utility Service Center 100 to execute the AAA process as described herein. The communications with the Utility Service Center 100 can be in the wireless mode via antenna 430, or a wired connection 520, or via the conductors of the plug 171. An RFID reader 575 is provided to scan RFID devices associated with the outlet/electric meter/premises to which Vehicle 101 is sited to recharge battery assembly 420 as described herein. Finally, the ID communication can also be via PLC across the grid from the Utility wherein the Utility has, through its vast PLC network overlaid on its Electric Grid, created a unique ID for each Outlet, where a given ID is communicated from plug 171 to PLC Communication Module 560. Given the grid is also a communication network with intelligence means any given outlet can have its ID dynamically modified per operational requirements of the Utility.

In addition, processor 580 is responsive to data transmitted from the Utility Service Center 100 to either activate or disable the converter module 550 as a function of the results of the AAA process. Once the charging process is completed, the processor 580 reads the data created by meter 570 and initiates a communication session via communications module 540 with the Utility Service Center 100 to report the identity of Vehicle 101, the energy consumption in the present recharging session, and the associated unique identification of Self-Identifying Power Source 116 thereby to enable the utility company to credit the owner of Self-Identifying Power Source 116 and also bill the vehicle owner.

Load Management Process

The Utility can effect load management by permitting the current flowing through plug 171 as controlled by processor 580 which is in communication with Utility Service Center 100 to be at a specified level, or it can be terminated for given periods of time when peak load conditions are occurring on the grid, say due to a heat wave where air conditioners are all on maximum.

Energy Consumption Billing Process

Figure 3:
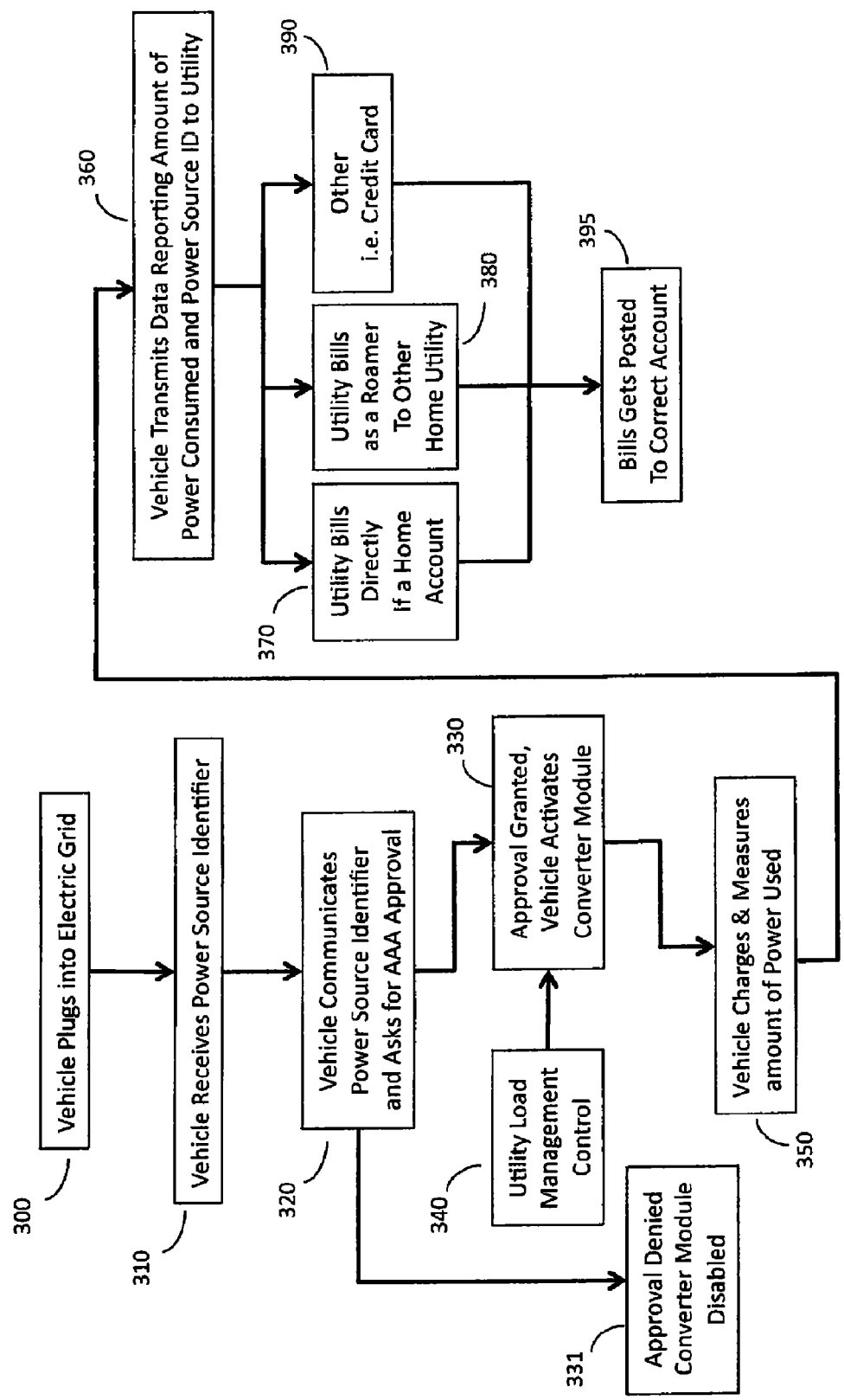
FIG. 3 illustrates, in flow diagram form, the operation of the billing system for the E-Grid system.
Figure 7:
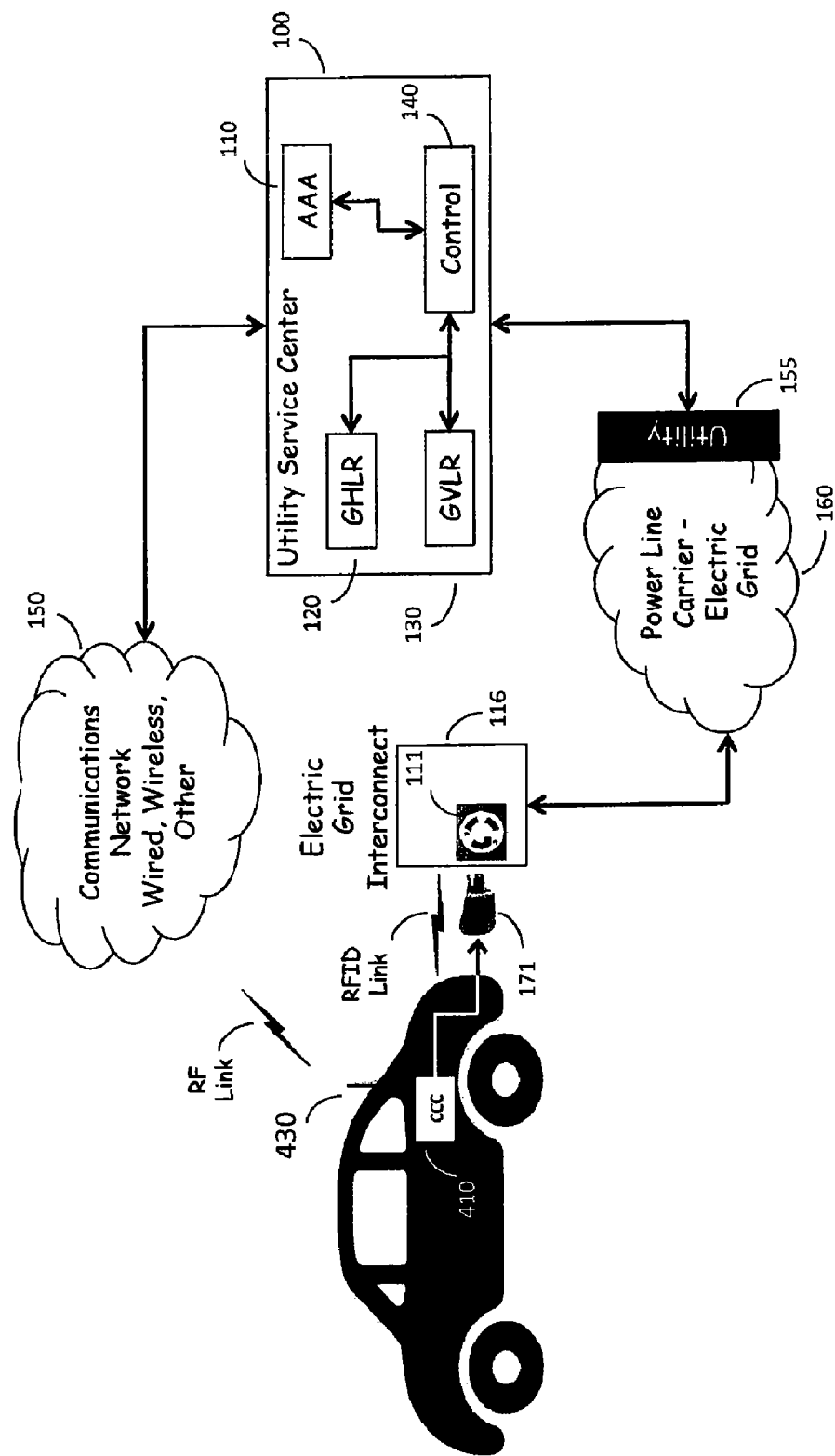
FIG. 7 illustrates, in block diagram form, the communications interconnections in use in the E-Grid network.

FIG. 3 illustrates, in flow diagram form, the operation of the billing system for the E-Grid system; and FIG. 7 illustrates, in block diagram form, the communications interconnections in use in the E-Grid network. For example, Vehicle 101 at step 300 plugs into outlet 111 of Self-Identifying Power Source 116 and at step 310 receives the Self-Identifying Power Source 116 identification information as described above, such as via an RFID link. At step 320, processor 580 accesses Communication Network 150 (or Power Line Carrier and Electric Grid 160) to communicate with Utility Service Center 100 and register on Grid Home Location Register 120 (or Grid Visitor Location Register 130). Vehicle 101 either is denied service at step 331 by Utility Service Center 100 due to a lack of credit, or lack of verification of identity, or gets authorization at step 330 from AAA System 110 to recharge the vehicle batteries 420. As a part of the communication process, processor 580 communicates all of the "Utility Centric" data it derived when it plugged into the Self-Identifying Power Source 116 as described above (utility name, location of charging outlet, and so on). As one means for managing possible charging fraud, the location of the charging jack could be cross-correlated with a GPS location (where a GPS module could be inserted into CCC Module 410 (not shown for clarity)).

An electrical power meter 570 inside Vehicle 101 measures the amount of energy being consumed at step 350. When plug 171 is pulled at step 360, and charging is complete, the meter in Vehicle 101 initiates a communication session via communication module 540 with Utility Service Center 100 to report the identity of Vehicle 101, the energy consumption in the present recharging session, and the associated unique identification of Self-Identifying Power Source 116 thereby to enable the utility company to credit the owner of Self-Identifying Power Source 116 and also bill the vehicle owner. In addition, the vehicle owner can be charged for the energy consumption via their home account at step 370, or via a roamer agreement at step 380, or via a credit card at step 390. At this point, if there were a property owner revenue share, this would also be recorded as a credit to that given property owner, and all billing is posted to the proper accounts at step 395. In addition, at step 360, the Utility Service Center 100 compiles the collected load data and transmits it to the local utility (155 on FIGS. 1 and 233, 234 on FIG. 2) to enable the local utility at step 340 to implement load control as described below.

A Simplified Communications Block Diagram—FIG. 7

In order to remove some of the architecture complexity, and to clearly describe the core invention in a slightly different manner, a minimalist figure (FIG. 7) was created to show the key building blocks of the E-grid system communication architecture. There are two key architectural elements that enable the preferred embodiment described herein: (1) the placement of the meter measuring the power consumption during the charging sequence into the vehicle itself; and (2) the addition of the Utility Service Center 100 to manage Authentication, Authorization, and Accounting, where Utility Service Center 100 enables any electrical outlet to be available for charging and enables any utility to be a "member" of the "E-grid" system. Shown in FIG. 7, a bidirectional communication network is created between the CCC (Charging, Control, and Communicator) Module 410 via Communications Network 150 and/or via Power Line Carrier via Electric Grid 160 to Utility Service Center 100. Within CCC Module 410 is a meter 570 that measures the power consumed during a charging cycle, and it communicates the amount of energy consumed via CCC Module 410 to antenna 430 via Communications Network 150 or Plug 171 via Electric Grid 160 ultimately to Utility Service Center 100. CCC Module 410 also receives the Self-Identifying Power Source 116 identification of the outlet 111 via RFID 613 and RFID Reader 575. The pairing of the unique Outlet ID with the energy consumed and measured by the vehicle are transmitted to Utility Service Center 100, which enables billing of the owner of the vehicle (or account holder for the vehicle), crediting of the owner of the physical plug (jack) where the power was taken from, and correct payment to the utility that supplied the energy.

Sub-Network Load Manager for Use in Recharging

Figure 8:
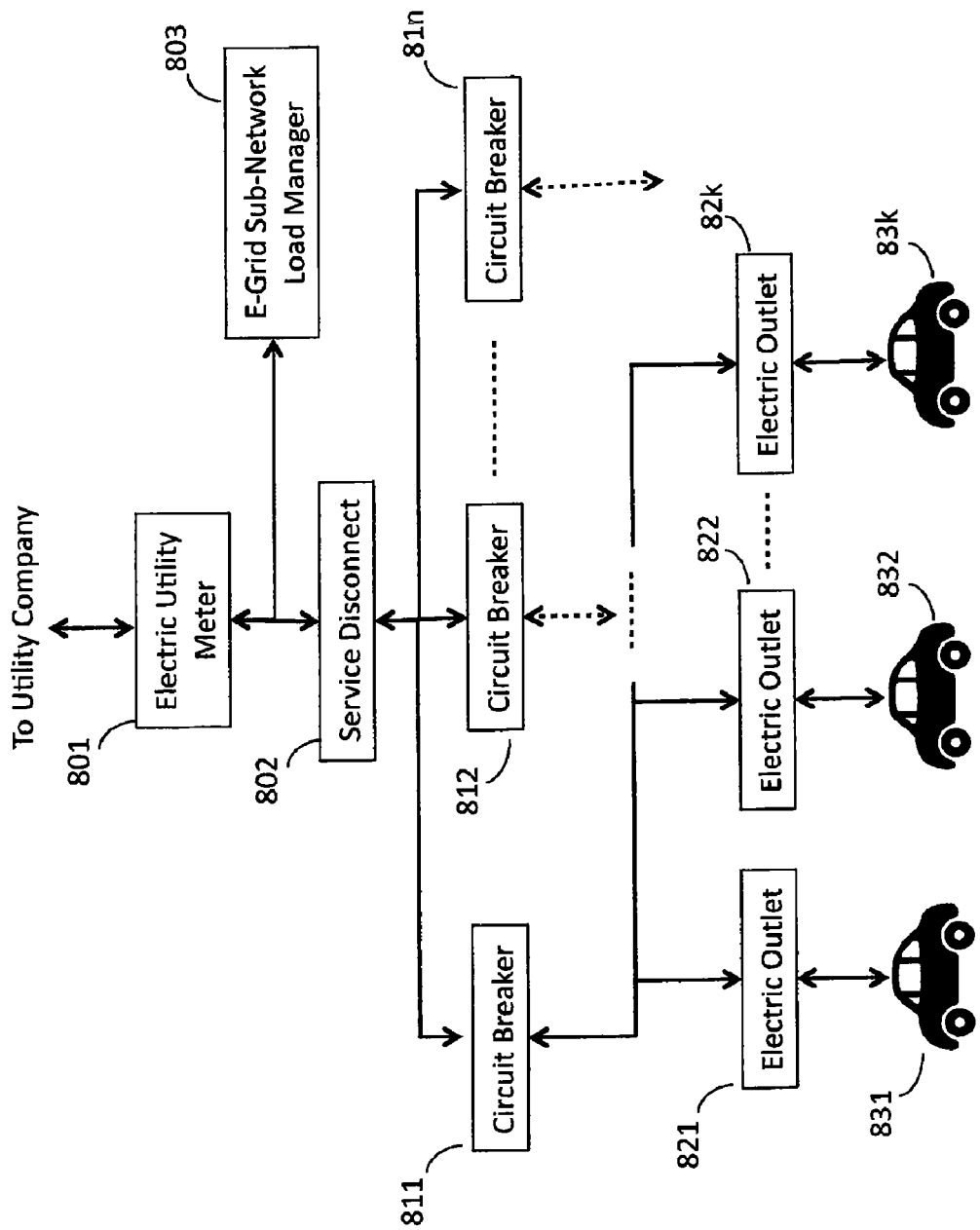
FIG. 8 illustrates, in block diagram form, the architecture of a typical E-Grid application of the E-Grid Sub-Network Load Manager, where an electric utility meter and its associated main service disconnect serve a plurality of circuit breakers, each of which serves a plurality of the Self-Identifying Power Sources.
Figure 9A:
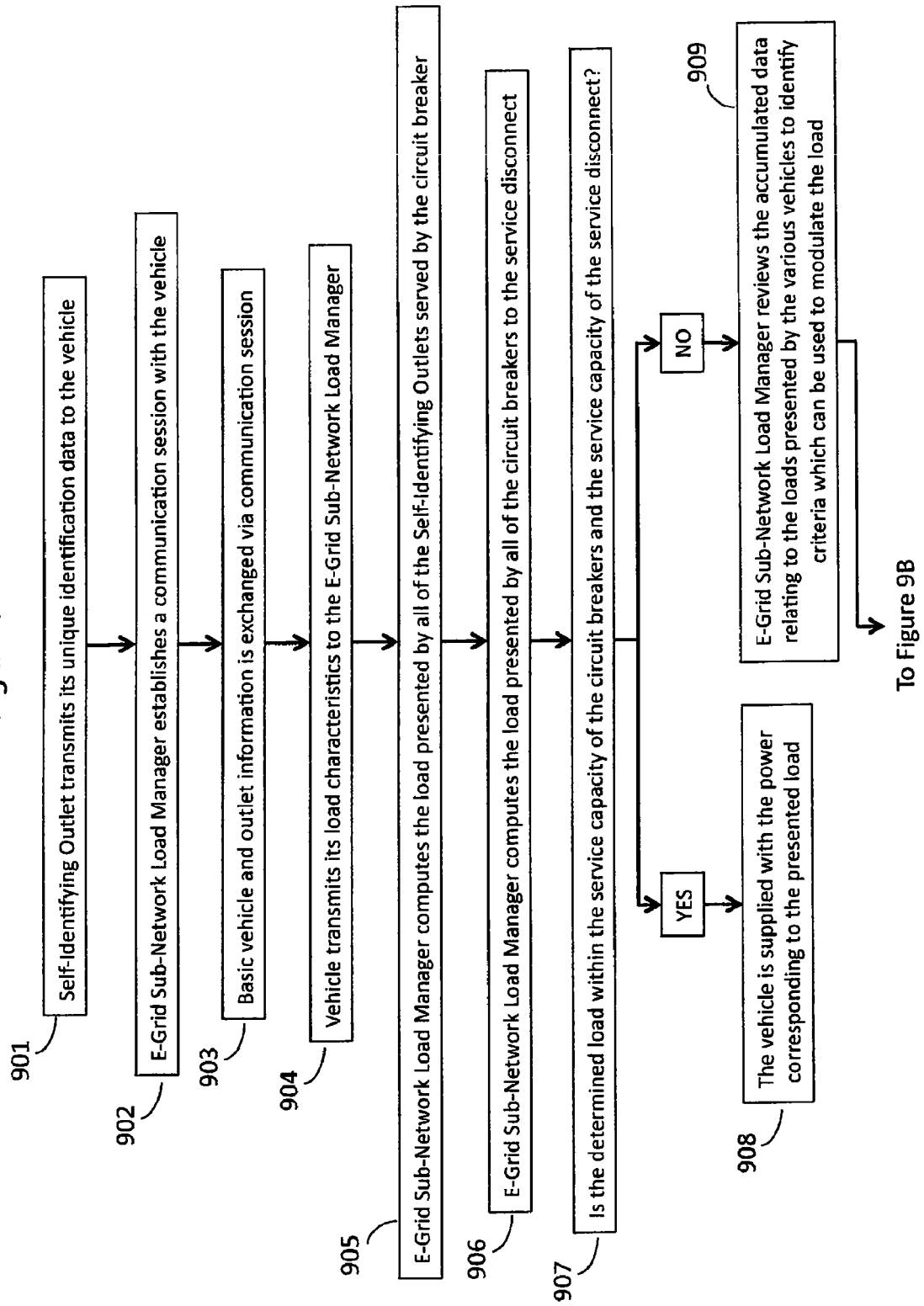
FIGS. 9A and 9B illustrate, in flow diagram form, the operation of the present E-Grid Sub-Network Load Manager.
Figure 9B:
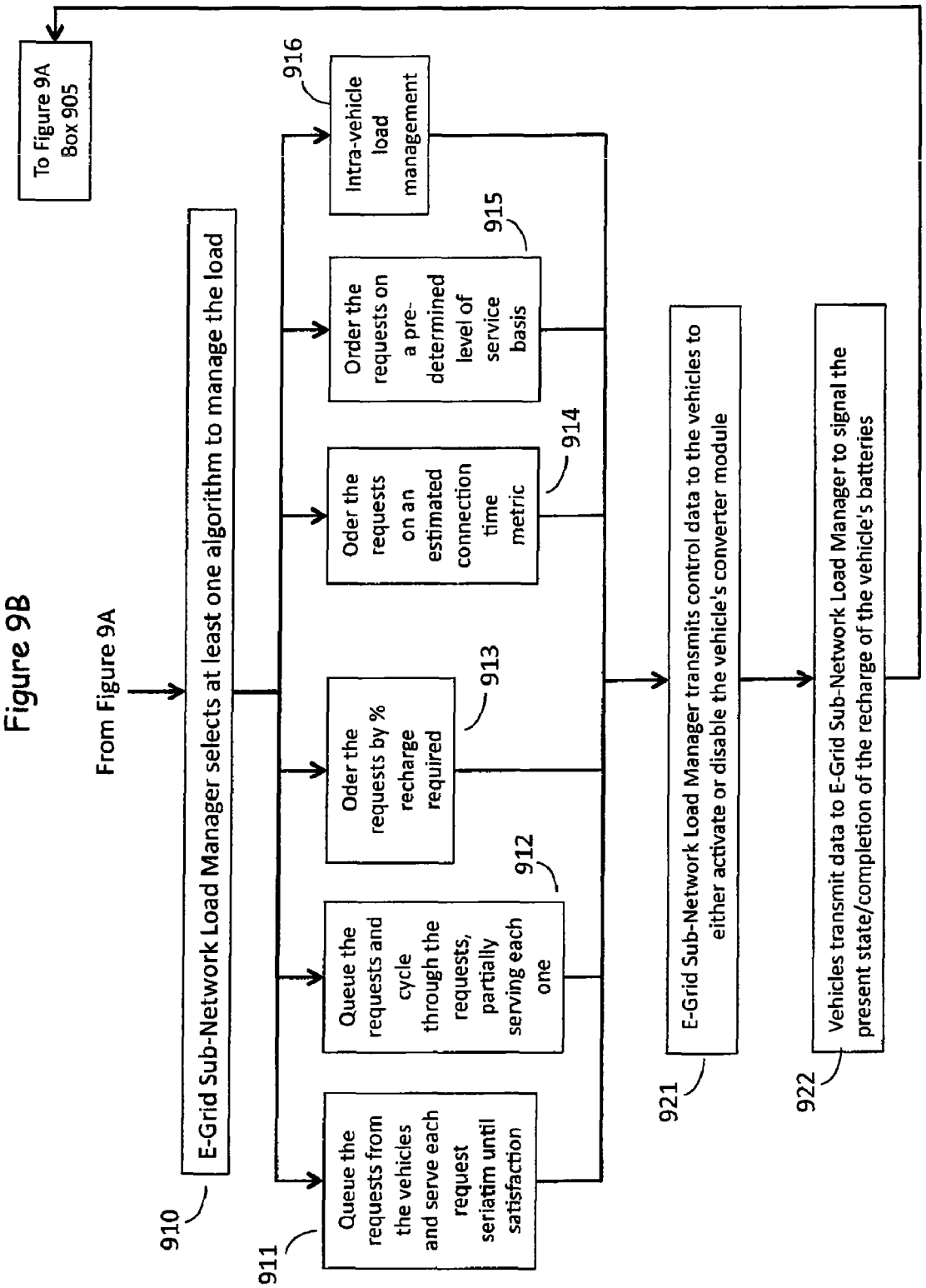

FIG. 8 illustrates, in block diagram form, the architecture of a typical E-Grid application of the E-Grid Sub-Network Load Manager 803, where an electric utility meter 801 and its associated main service disconnect 802 serve a plurality of circuit breakers 811-81n, each of which serves a plurality of the Self-Identifying Power Sources (such as Self-Identifying Outlets 821-82k); and FIGS. 9A and 9B illustrate, in flow diagram form, the operation of the E-Grid Sub-Network Load Manager 803.

As shown in FIG. 8, a single electric utility meter 801 and its associated service disconnect 802 serve a plurality of circuit breakers 811-81n, where each disconnect or circuit breaker (such as 811) serves a plurality of Outlets (821-82k). The E-Grid Sub-Network Load Manager 803 typically is associated with electric utility meter 801 and its associated service disconnect 802 and serves to regulate the load presented by the vehicles connected to the plurality of Outlets served by electric meter 801 and its associated service disconnect 802.

As noted above, the Self-Identifying Outlet 821 at step 901 transmits its unique identification data to vehicle 831 in order to enable vehicle 831 to associate the power consumption as metered by vehicle 831 with the Self-Identifying Outlet 821, as described above. The E-Grid Sub-Network Load Manager 803 at step 902 in FIG. 9 is responsive to the connection of a vehicle 831 to outlet 821 of circuit breaker 811 to establish a communication session between vehicle 831 and E-Grid Sub-Network Load Manager 803, typically via Power Line Communications. The communication session typically is brief and represents the exchange of basic information, such as transmitting the identification of Self-Identifying Outlet 821 by vehicle 831 to E-Grid Sub-Network Load Manager 803 at step 903, as well as vehicle 831 transmitting its load characteristics at step 904 to E-Grid Sub-Network Load Manager 803. The load characteristics consist of the amount of energy required by vehicle 831 to achieve a complete charge, as well as optionally the charging characteristics of vehicle 831 (current capacity, type of charger, etc.), the estimated time that the vehicle will be connected to Self-Identifying Outlet 821, the class of recharge service subscribed to by vehicle 831, and the like.

At step 905, the E-Grid Sub-Network Load Manager 803 computes the load presented by all of the Self-Identifying Outlets 821-82k served by circuit breaker 811 as well as the load presented by all of the circuit breakers 811-81n to service disconnect 802 at step 906. If the load is determined at step 907 to be within the service capacity of circuit breaker 811 and service disconnect 802, at step 908 vehicle 831 is supplied with the power corresponding to the load presented by vehicle 831. If the load presented by vehicle 831, when combined with the loads presented by other vehicles served by service disconnect 802, is determined at step 907 to exceed the current carrying capacity of circuit breaker 811 or the current carrying capacity of service disconnect 802, E-Grid Sub-Network Load Manager 803 reviews the accumulated data relating to the loads presented by the various vehicles served by service disconnect 802.

This vehicle load data, as noted above, can be used at step 909 to identify criteria which can be used to modulate the load presented to circuit breakers 811-81n and service disconnect 802. In particular, the load management algorithms used by E-Grid Sub-Network Load Manager 803 can be hierarchical in nature, such that a sequence of load management processes (stored in E-Grid Sub-Network Load Manager 803) can be successively activated to identify vehicles which can receive less than the full component of power to recharge their batteries, or an algorithm can be selected to cycle through the vehicles served by service disconnect 802 to maintain a power delivery level commensurate with the power handling capacity of the circuit breakers 811-81n and service disconnect 802.

For example, at step 910, E-Grid Sub-Network Load Manager 803, in response to the received load data, selects at least one algorithm to manage the load. The selection can be based upon historical data which indicates a typical or historical pattern of loads presented at this locale over time for this day of the week or day of the year. The present load can be compared to this typical or historical data to anticipate what loads can be expected in the immediate future, which comparison information can assist in the present decisions relating to load control. FIG. 9B illustrates a typical plurality of algorithms which can be used by E-Grid Sub-Network Load Manager 803. At step 911, a first E-Grid Sub-Network Load Manager 803 load management process queues the requests from the vehicles and serves each request in sequence until satisfaction. At step 912, a second E-Grid Sub-Network Load Manager 803 load management process queues the requests and cycles through the requests, partially serving each one, then proceeding to the next until the cyclic partial charging service has satisfied all of the requests. At step 913, a third E-Grid Sub-Network Load Manager 803 load management process orders the requests pursuant to a percentage of recharge required measurement, then proceeds to one of the above-noted service routines: serving each request in order to completion or cycling through the requests using a partial completion paradigm. At step 914, a fourth E-Grid Sub-Network Load Manager 803 load management process orders the requests on an estimated connection time metric, then proceeds to one of the above-noted service routines: serving each request in order to completion, or cycling through the requests using a partial completion paradigm. At step 915, a fifth E-Grid Sub-Network Load Manager 803 load management process orders the requests on a predetermined level of service basis, then proceeds to one of the above-noted service routines: serving each request in order to completion, or cycling through the requests using a partial completion paradigm. Finally, an intra-vehicle load management process (as described below) can be used to distribute power among a plurality of vehicles. Additional load management processes can be used, and these listed processes are simply presented for the purpose of illustration.

These load management processes can be implemented on a per circuit breaker, sub-network basis, or can be implemented for the entirety of the Self-Identifying Outlets served by the service disconnect 802. In addition, E-Grid Sub-Network Load Manager 803 can select different processes for each circuit breaker sub-network and also can alter the load management process activated as new vehicles are either connected to Self-Identifying Outlets or depart from Self-Identifying Outlets or the various vehicles connected to Self-Identifying Outlets are recharged. Thus, the load management process implemented by E-Grid Sub-Network Load Manager 803 is dynamic and varies in response to the load presented by the vehicles which are served.

The E-Grid Sub-Network Load Manager 803 typically implements control of the recharging of the vehicles by transmitting, at step 921, control data to vehicle 831 and/or other vehicles served by service disconnect 802, which control data is used by processor 580 in vehicle 831 to either activate the vehicle's converter module 550 or disable the vehicle's converter module 550. As the batteries in vehicle 831 are recharged, processor 580 determines the present state of recharge and can transmit data at step 922 to E-Grid Sub-Network Load Manager 803 to signal the completion of the recharge of the vehicle's batteries or to provide a periodic recharge status report. At this juncture, E-Grid Sub-Network Load Manager 803 uses this data at the above-described step 910 to compute the action required to continue to manage the delivery of power to the plurality of vehicles served by service disconnect 802.

Intra-Vehicle Power Exchange Management

Another load management process is the intra-vehicle power exchange management process 916, noted above, where power is drawn from the already charged (or partially charged) batteries of a vehicle and used to recharge the batteries of another vehicle served by service disconnect 802. As an example, the load presented by all of the vehicles connected to the Self-Identifying Outlets served by service disconnect 802 or served by one or more circuit breakers (such as circuit breaker 811) can exceed the present capacity of the system to recharge these vehicles. If one or more of these vehicles is fully recharged or substantially recharged, power can flow from the batteries of these vehicles to the batteries of vehicles whose batteries have a remaining charge below some predetermined minimum threshold. This intra-vehicle power exchange process continues until the overall load on the E-Grid system drops to a level which enables the E-Grid system to serve the requests or when these vehicles are recharged to a predetermined level, where they can be queued up for regular service in due course. Thus, the intra-vehicle power exchange process can be an interim solution to ensure that all of the vehicles served by service disconnect 802 are quickly recharged to some acceptable minimum level, then the standard recharging process is activated.

Figure 10:
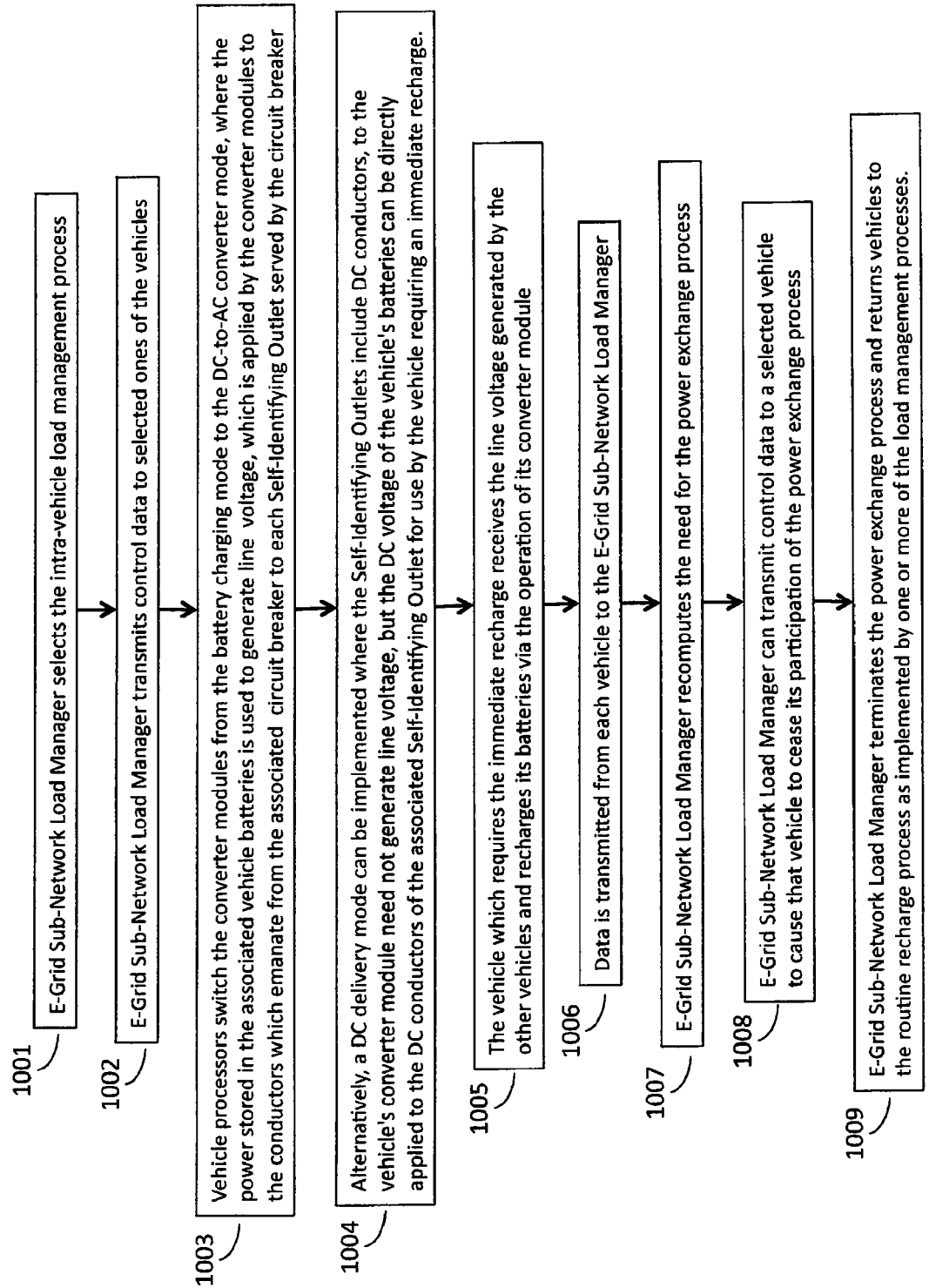
FIG. 10 illustrates, in flow diagram form, operation of a typical intra-vehicle power exchange management process.

The intra-vehicle power exchange is illustrated, in flow diagram form, in FIG. 10, where, at step 1001, E-Grid Sub-Network Load Manager 803 selects the load management process 916 for application to a plurality of Self-Identifying Outlets 821-82k, such as those served by circuit breaker 811. At step 1002, E-Grid Sub-Network Load Manager 803 transmits control data to selected ones of vehicles 831, 832 to activate their processors 580 at step 1003 to switch the converter modules 550 from the battery charging mode to the DC-to-AC converter mode, where the power stored in the associated vehicle batteries is used to generate line voltage, which is applied by the converter modules 550 to the conductors which emanate from circuit breaker 811 to each Self-Identifying Outlet 821-82k served by circuit breaker 811. Alternatively, a DC delivery mode can be implemented at step 1004 where the Self-Identifying Outlets include DC conductors and the vehicle's converter module need not generate line voltage, but the DC voltage of the vehicle's batteries can be directly applied to the DC conductors of the associated Self-Identifying Outlet for use by vehicle 83k requiring an immediate recharge.

At step 1005, vehicle 83k which requires the immediate recharge receives the line voltage generated by the other vehicles 831, 832 and recharges its batteries via the operation of its converter module 550. As this vehicle 83k recharges its batteries and the other vehicles 831, 832 have their batteries drained, data is transmitted from each vehicle at step 1006 to E-Grid Sub-Network Load Manager 803 to enable E-Grid Sub-Network Load Manager 803 to re-compute the need for the power exchange process at step 1007 to ensure that vehicles 831, 832 which are supplying the power do not drain their batteries below an acceptable level. As this process progresses, E-Grid Sub-Network Load Manager 803, at step 1008, can transmit control data to a vehicle, such as vehicle 832, to cause that vehicle to cease its participation of the power exchange process. Furthermore, at step 1009, E-Grid Sub-Network Load Manager 803 can terminate power exchange process 916 and return vehicles 831, 832, 83k to the routine recharge process as implemented by one or more of the load management processes 911-915.

Centralized Load Management

The Utility Service Center 100 is the origination point for a Network-Wide Load Management situation, in which Vehicles 101 and 102 of FIG. 1 (or Vehicles 291-295 of FIG. 2) can be controlled to temporarily stop charging, where they are either not served by an E-Grid Sub-Network Load Manager 803, or the Utility Service Center elects to override the operation of E-Grid Sub-Network Load Manager 803. There is a mapping algorithm that maps the geographic position of the charging device (via GPS) or via the Grid Identifier passed along by the Vehicle. The Utility knows that Vehicles 101 and 102, for example, are in a region that is experiencing very heavy electrical demand. So, to help manage the demand, the Utility Company 155, via Communication Network 150 (or via PLC across Electric Grid 160 to Utility Interface 114) sends a command to Vehicles 101, 102 to temporarily stop charging (or until demand is lighter to re-initiate the charging sequence). In addition, the vehicles could be instructed to continue their charging sequence but charge at a lower level, or a given vehicle could ask for permission to charge at a very high rate to reduce the charge time.

Using the Stored Energy in the Vehicle Batteries as a Peaking Source of Power for the Utility As shown in FIG. 1, Vehicles 101, 102 are able to charge from the Electric Grid 160 via conductors 163, and are also able to "push" energy back to Electric Grid 160 via conductors 163. Similarly, in FIG. 2, Vehicles 291-295 are able to charge from Electric Grids 240, 250 via conductors 271-275, and are able to "push" energy back to Electric Grids 240, 250 via conductors 271-275. This "pushing" of energy from the vehicles' energy storage systems, whether they are batteries or some other form of energy storage device, permits the utilities to manage peak loads on the network by using the collective energy of all of the vehicles then connected to the E-Grid as "peakers" and it would diminish the need for utilities to build "Peaking Power Plants", which are very expensive to build and very expensive to operate, to handle the infrequent times when they need more energy to be supplied to the grid to prevent brownouts and blackouts.

SUMMARY

The present Self-Identifying Power Source For Use In Recharging Vehicles Equipped With Electrically Powered Propulsion Systems provides a unique identification of an outlet to a vehicle which is connected to the outlet to enable the vehicle to report the vehicle's power consumption to the utility company to enable the utility company to bill the vehicle owner and credit the outlet owner for the power consumed by the recharging of the vehicular battery banks.

What is claimed as new and desired to be protected by Letters Patent of the United States is:

1. A system for controllably providing power to recharge a plurality of vehicles, each of which includes a propulsion system powered, at least in part, by electric power, at least some of which is stored onboard the vehicle in an electric power storage apparatus, comprising:

an Electric Grid Interconnect which is connected to a source of electric power for providing electric power to an electric power storage apparatus which is located in each vehicle;

a plurality of electric outlets, each of which is connected to said Electric Grid Interconnect via a conductive path and to said vehicles, to enable a flow of electric power from said source of electric power to said electric power storage apparatus located in said vehicles; and a load manager, responsive to receipt of electric power load data from said vehicles, for allocating electric power distribution and billing, comprising:
- load calculator, responsive to receipt of electric outlet identification and electric power load data from said vehicles, for determining a present electric power load served by said Electric Grid Interconnect,
- load management process selector, responsive to said determined present electric power load served by said Electric Grid Interconnect, for selecting the second vehicle connected to said outlets to output electric power on said conductive path for use by the first vehicle connected to said conductive path, and
- usage reconciler for billing an owner of a first vehicle for energy usage and also to credit an owner of a second vehicle for the energy usage billed to the owner of the second vehicle and delivered to the first vehicle.

2. The system for controllably providing power to recharge a plurality of vehicles of claim 1, further comprising:
- power converter module, located in said vehicle, to control said electric power load presented to said electric outlet.

3. The system for controllably providing power to recharge vehicles which utilize electric power of claim 2 wherein said load management process selector activates said power converter module in said selected vehicle to draw electric power from said electric power storage apparatus in said selected vehicle and to output power on said conductive path for use by said other vehicles.

4. The system for controllably providing power to recharge a plurality of vehicles of claim 1 wherein said load manager further comprises:
- dynamic load adjustor, responsive to receipt of updated electric power load data from a vehicle, for submitting said received updated electric power load data to said load calculator.

5. The system for controllably providing power to recharge a plurality of vehicles of claim 4 wherein said dynamic load adjustor comprises:
- difference calculator for computing a difference between said received updated electric power load data and the electric power load data from said vehicle used to compute said present electric power load; and
- threshold calculator for determining if said difference exceeds a predetermined threshold.

6. The system for controllably providing power to recharge a plurality of vehicles of claim 5 wherein said dynamic load adjustor further comprises:
- load management trigger, responsive to said difference exceeding said predetermined threshold, for submitting said updated electric power load data to said load calculator.

7. The system for controllably providing power to recharge a plurality of vehicles of claim 1 wherein said Electric Grid Interconnect further comprises:
- a plurality of circuit breakers, each of which interconnects at least one of said electric outlets to said source of electric power, for regulating delivery of electric power from said source of electric power to said at least one electric outlet.

8. The system for controllably providing power to recharge a plurality of vehicles of claim 7, further comprising:
- wherein said load calculator determines a present electric power load served by each of said circuit breakers; and
- wherein said load management process selector is responsive to said present electric power load served by each of said circuit breakers for selecting at least one vehicle connected to a selected circuit breaker to output electric power on said conductive path for use by other vehicles connected to said selected circuit breaker.

9. A method for controllably providing power to recharge a plurality of vehicles, each of which includes a propulsion system powered, at least in part, by electric power, at least some of which is stored onboard the vehicle in an electric power storage apparatus, comprising:
- providing, via an Electric Grid Interconnect which is connected to a source of electric power, electric power to an electric power storage apparatus which is located in each vehicle;
- interconnecting a plurality of electric outlets, each of which is connected to said Electric Grid Interconnect via a conductive path and to said vehicles, to enable a flow of electric power from said source of electric power to said electric power storage apparatus located in said vehicles; and
- enabling, in response to receipt of electric power load data from said vehicles, a subset of said vehicles to receive a flow of electric power from other of said vehicles comprising:
  - determining, in response to receipt of said electric outlet identification and electric power load data from said vehicles, a present electric power load served by said Electric Grid Interconnect,
  - selecting, in response to said determined present electric power load served by said Electric Grid Interconnect, the second vehicle connected to said outlets to output electric power on said conductive path for use by the first vehicle connected to said conductive path, and
  - billing an owner of a first vehicle for energy usage and also to credit an owner of a second vehicle for the energy usage billed to the owner of the second vehicle and delivered to the first vehicle.

10. The method for controllably providing power to recharge a plurality of vehicles of claim 9, further comprising:
- operating a power converter module, located in said vehicle, to control said electric power load presented to said electric outlet.

11. The method for controllably providing power to recharge vehicles which utilize electric power of claim 10 wherein said step of selecting activates said power converter module in said selected vehicle to draw electric power from said electric power storage apparatus in said selected vehicle output to output electric power on said conductive path for use by said other vehicles.

12. The method for controllably providing power to recharge a plurality of vehicles of claim 9 wherein said step of enabling further comprises:
- submitting, in response to receipt of updated electric power load data from a vehicle, said received updated electric power load data to said load calculator.

13. The method for controllably providing power to recharge a plurality of vehicles of claim 12 wherein said step of submitting comprises:
- computing a difference between said received updated electric power load data and the electric power load data from said vehicle used to compute said present electric power load; and
- determining if said difference exceeds a predetermined threshold.

14. The method for controllably providing power to recharge a plurality of vehicles of claim 13 wherein said step of selecting further comprises:
- submitting, in response to said difference exceeding said predetermined threshold, said updated electric power load data to said load calculator.

15. The method for controllably providing power to recharge a plurality of vehicles of claim 9 wherein said step of providing further comprises:

regulating, via a plurality of circuit breakers each of which interconnects at least one of said electric outlets to said source of electric power, delivery of electric power from said source of electric power to said at least one electric outlet.

16. The method for controllably providing power to recharge a plurality of vehicles of claim 15, further comprising:

determining a present electric power load served by each of said circuit breakers;

wherein said step of selecting, in response to said present electric power load served by each of said circuit breakers, at least one vehicle connected to a selected circuit breaker to output electric power on said conductive path for use by other vehicles connected to said selected circuit breaker.

* * * * *